United States Patent
Ha et al.

(10) Patent No.: US 12,027,774 B2
(45) Date of Patent: Jul. 2, 2024

(54) ANTENNA STRUCTURE AND ELECTRONIC DEVICE COMPRISING SAME

(71) Applicant: SAMSUNG ELECTRONICS CO., LTD., Suwon-si (KR)

(72) Inventors: Dohyuk Ha, Suwon-si (KR); Kwanghyun Baek, Suwon-si (KR); Juneseok Lee, Suwon-si (KR); Jinsu Heo, Suwon-si (KR); Youngju Lee, Suwon-si (KR); Jungyub Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 146 days.

(21) Appl. No.: 17/754,893

(22) PCT Filed: Oct. 14, 2020

(86) PCT No.: PCT/KR2020/013970
§ 371 (c)(1),
(2) Date: Apr. 14, 2022

(87) PCT Pub. No.: WO2021/075836
PCT Pub. Date: Apr. 22, 2021

(65) Prior Publication Data
US 2023/0099560 A1    Mar. 30, 2023

(30) Foreign Application Priority Data
Oct. 15, 2019    (KR) .................. 10-2019-0128069

(51) Int. Cl.
*H01Q 21/06*    (2006.01)
*H01Q 1/22*    (2006.01)
(Continued)

(52) U.S. Cl.
CPC ......... *H01Q 21/065* (2013.01); *H01Q 1/2283* (2013.01); *H01Q 13/06* (2013.01);
(Continued)

(58) Field of Classification Search
CPC ........ H01Q 1/2283; H01Q 1/02; H01Q 1/241; H01Q 1/243; H01Q 1/46; H01Q 13/06;
(Continued)

(56) References Cited

U.S. PATENT DOCUMENTS

| 9,225,070 B1 | 12/2015 | Zeweri et al. |
| 9,490,532 B2 | 11/2016 | Maruyama et al. |

(Continued)

FOREIGN PATENT DOCUMENTS

| KR | 10-2019-0043026 | 12/1899 |
| KR | 10-2013-0062717 A | 6/2013 |

(Continued)

OTHER PUBLICATIONS

Office Action dated Jun. 14, 2023, in connection with Korean Application No. 10-2019-0128069, 5 pages.

(Continued)

*Primary Examiner* — Hoang V Nguyen

(57) ABSTRACT

The present disclosure relates to a $5^{th}$ generation (5G) or pre-5G communication system for supporting higher data transmission rates than a $4^{th}$ generation (4G) communication system such as long-term evolution (LTE). An antenna module in a wireless communication system includes: a printed circuit board (PCB); a radio frequency integrated circuit (RFIC); and a plurality of antenna elements for emitting a radio frequency (RF) signal, wherein the plurality of antenna elements may be disposed in a first area of a first surface of the PCB, and the RFIC may be disposed in a second area, different from the first area, of the first surface of the PCB.

20 Claims, 9 Drawing Sheets

(51) Int. Cl.
*H01Q 13/06* (2006.01)
*H01Q 21/00* (2006.01)

(52) U.S. Cl.
CPC ..... *H01Q 21/0025* (2013.01); *H01Q 21/0075* (2013.01); *H01Q 21/064* (2013.01)

(58) Field of Classification Search
CPC .. H01Q 21/061; H01Q 21/064; H01Q 21/065; H01Q 21/0025; H01Q 21/0075; H01Q 21/28
See application file for complete search history.

(56) References Cited

U.S. PATENT DOCUMENTS

| 10,797,405 | B1 | 10/2020 | Baek et al. |
| 2007/0231951 | A1 | 10/2007 | Suryakumar |
| 2011/0181484 | A1 | 7/2011 | Pettus et al. |
| 2013/0141284 | A1 | 6/2013 | Jeong |
| 2016/0276734 | A1 | 9/2016 | Jin et al. |
| 2016/0351996 | A1 | 12/2016 | Ou |
| 2017/0084554 | A1 | 3/2017 | Dogiamis et al. |
| 2017/0125895 | A1 | 5/2017 | Baks et al. |
| 2018/0090813 | A1 | 3/2018 | Yoon et al. |
| 2018/0090814 | A1 | 3/2018 | Yoon et al. |
| 2018/0090815 | A1 | 3/2018 | Shirinfar et al. |
| 2018/0175901 | A1* | 6/2018 | Heo ..................... H04B 1/40 |
| 2019/0115646 | A1 | 4/2019 | Chiu et al. |
| 2019/0131690 | A1 | 5/2019 | Lu et al. |

FOREIGN PATENT DOCUMENTS

| KR | 10-2016-0112154 A | 9/2016 | |
| WO | WO-2018199632 A1 * | 11/2018 | ............... H01Q 1/24 |
| WO | 2019/124984 A1 | 6/2019 | |

OTHER PUBLICATIONS

International Search Report and Written Opinion of the International Searching Authority in connection with International Application No. PCT/KR2020/013970 dated Feb. 3, 2021, 10 pages.
Supplementary European Search Report dated Oct. 21, 2022 in connection with European Patent Application No. 20 87 6541, 9 pages.
Notice of Preliminary Rejection dated Nov. 30, 2022 in connection with Korean Patent Application No. 10-2019-0128069, 13 pages.

* cited by examiner

ANTENNA STRUCTURE AND ELECTRONIC DEVICE COMPRISING SAME

CROSS-REFERENCE TO RELATED APPLICATIONS

This application is a 371 of International Application No. PCT/KR2020/013970, filed Oct. 14, 2020, which claims priority to Korean Patent Application No. 10-2019-0128069, filed Oct. 15, 2019, the disclosures of which are herein incorporated by reference in their entirety.

BACKGROUND

1. Field

The disclosure relates to an antenna structure and an electronic device including the same.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "beyond 4G network" communication system or a "post long term evolution (post LTE)" system.

The 5G communication system is considered to be implemented in ultra-higher frequency (mmWave) bands (e.g., 60 GHz bands) so as to accomplish higher data rates. To decrease the propagation loss and increase the transmission distance of the radio waves in the ultra-higher frequency bands, beamforming, massive multiple-input multiple-output (massive MIMO), full dimensional MIMO (FD-MIMO), array antenna, analog beam forming, large scale antenna techniques are discussed in 5G communication systems.

In addition, in 5G communication systems, technical development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying and quadrature amplitude modulation (FQAM) and sliding window superposition coding (SWSC) as an advanced coding modulation (ACM) scheme, and filter bank multi carrier (FBMC), non-orthogonal multiple access (NOMA), and sparse code multiple access (SCMA) as an advanced access technology have also been developed.

There has been development of products equipped with multiple antennas in order to improve the communication performance, and it is expected that there will be use of equipment having an increasing number of antennas by utilizing Massive MIMO technology. There has been a demand for efforts to reduce the loss occurring in antennas in order to improve the communication performance.

SUMMARY

Based on the above discussion, the disclosure provides a structure, a module, and a device for disposing a radio frequency integrated circuit (RFIC) and an antenna on an identical surface of a board in a wireless communication system.

In addition, the disclosure provides a structure, a module, and a device for reducing feeding loss between a RFIC and an antenna in a wireless communication system.

In addition, the disclosure provides a device and a method for disposing a RFIC between antenna elements on a board in a wireless communication system.

In addition, the disclosure provides a structure, a module, and a device for implementing an antenna through a cavity inside a board without a radiation pattern in a wireless communication system.

According to various embodiments of the disclosure, an antenna module in a wireless communication system may include: a printed circuit board (PCB); a radio frequency integrated circuit (RFIC); and multiple antenna elements configured to radiate a radio frequency (RF) signal, wherein the multiple antenna elements are arranged in a first area of a first surface of the PCB, and the RFIC is disposed in a second area of the first surface of the PCB different from the first area.

According to various embodiments of the disclosure, an antenna module in a wireless communication system may include: a printed circuit board (PCB); and a radio frequency integrated circuit (RFIC), wherein the PCB includes multiple cavities formed based on vias, the vias, in a first area of a first surface of the PCB, are arranged to penetrate one or more metal layers inside the PCB, and the RFIC is disposed in a second area of the first surface of the PCB different from the first area.

A device and a method according to various embodiments of the disclosure reduce the distance between a radiation element for radiating signals and a radio frequency integrated circuit (RFIC) such that, by reducing the insertion loss of an antenna module, the communication performance can be improved.

In addition, a device and a method according to various embodiments of the disclosure makes it possible to reduce manufacturing costs through shared use of an antenna with a board including a RFIC.

Advantageous effects obtainable from the disclosure may not be limited to the above-mentioned effects, and other effects which are not mentioned may be clearly understood, through the following descriptions, by those skilled in the art to which the disclosure pertains.

DETAILED DESCRIPTION

Figure 1:
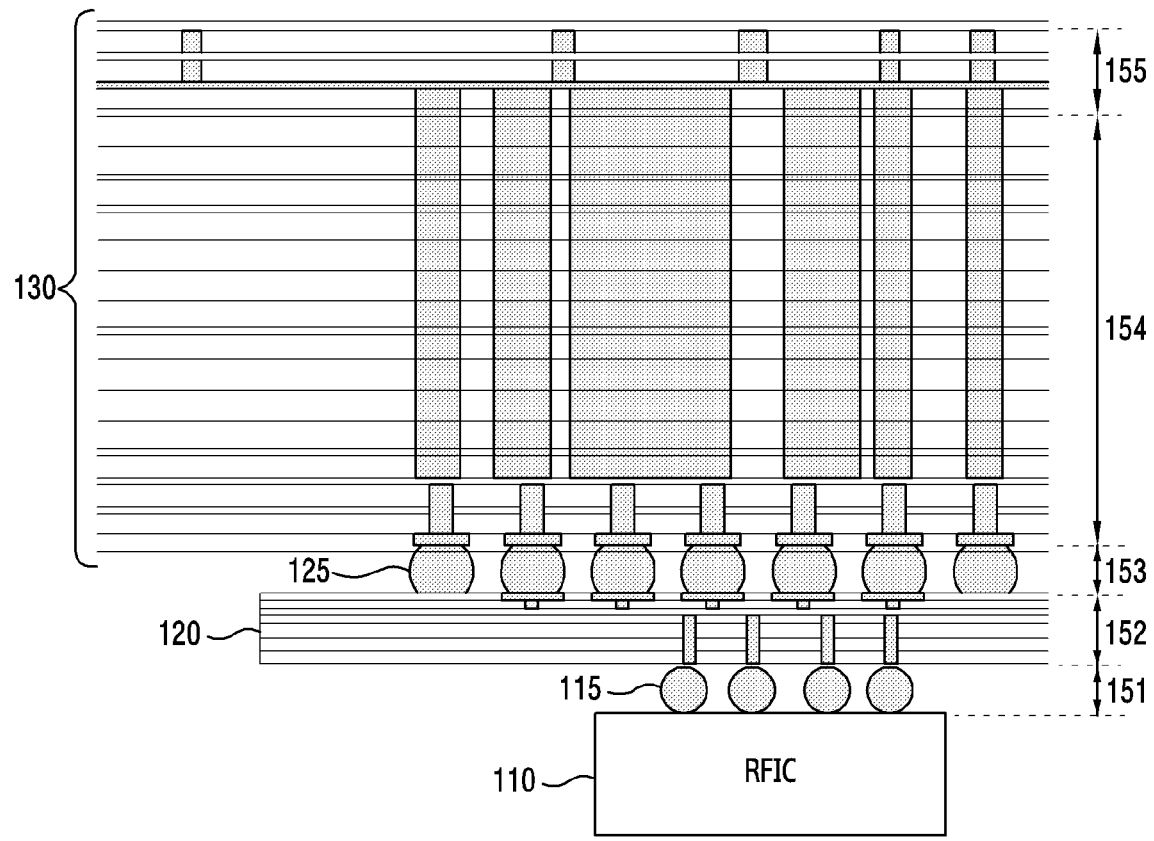
FIG. 1 illustrates an example of an antenna module including a layer structure of an antenna and a radio frequency integrated circuit (RFIC).

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

In the disclosure, although various embodiments are described using terms used in some communication standards (e.g., 3rd Generation Partnership Project (3GPP)), this may be merely an example for explanation. Various embodiments of the disclosure may be easily modified to apply to other communication systems also.

Hereinafter, the disclosure relates to an antenna module for a wireless communication system and an electronic device including same. Specifically, the disclosure describes a technique in which the physical distance between an antenna configured to radiate a signal and a radio frequency integrated circuit (RFIC) for a radio frequency (RF) signal is reduced so as to minimize loss (e.g., insertion loss according to a feeding line) in an antenna module. Particularly, it may be expected that equipment with a much larger number of antennas will be used by the mmWave technology, and thus a more efficient antenna design is required in terms of production cost together with high performance due to low loss.

The terms (e.g., a board, a substrate, a printed circuit board (PCB), a flexible PCB (FPCB), a module, an antenna, an antenna element, a circuit, a processor, a chip, an element, and a device) for indicating components of an electronic device, the terms (e.g., a structure body, a structure, a support part, a contact part, a protrusion, and an opening) for indicating the shapes of components thereof, the terms (e.g., a connection line, a feeding line, a connection part, a contact part, a feeding unit, a support part, a contact structure body, a conductive member, an assembly) for indicating the connection between structure bodies, the terms (e.g., a PCB, an FPCB, a signal line, a feeding line, a data line, an RF signal line, an antenna line, an RF path, an RF module, and an RF circuit) for indicating a circuit, and the like, which are used in the description below, may be exemplified for convenience of descriptions. Therefore, the disclosure may not be limited to the terms described later, and other terms with equivalent technical meanings may be used herein. In addition, the terms such as " . . . part", " . . . er or . . . or", " . . . member", and " . . . body" to be used hereinafter may mean at least one shape structure or a unit for performing a function.

Hereinafter, in order to describe an antenna structure of the disclosure and an electronic device including same, although the elements of a base station are described as examples, various embodiments of the disclosure may not be limited thereto. The antenna structure of the disclosure and the electronic device including same may be also applied to equipment requiring a stable connection structure of a terminal and communication components for other signal processes in addition to a base station.

A base station may be a network infrastructure that provides wireless connection to a terminal, and may be referred to as "an access point (AP)", "an eNodeB (eNB)", "a 5th generation (5G) node", "a 5G nodeB (NB)", "a wireless point", "a transmission/reception point (TRP)", "an access unit (AU)", "a distributed unit (DU)", "a transmission/reception point (TRP)", "a radio unit (RU)", 'a remote radio head (RRH)', or other terms having the equivalent technical meanings in addition to a base station. According to an embodiment, an antenna structure of the disclosure may be implemented by being included in an RU (or AU) of a base station.

A terminal may be a device used by a user, may perform communication with a base station through a wireless channel, and may be referred to as "a user equipment (UE)", "a mobile station", "a subscriber station", "a customer premises equipment (CPE)", "a remote terminal", "a wireless terminal", "an electronic device", "a vehicle terminal", "a user device", or other terms having an equivalent technical meaning in addition to a terminal.

In the disclosure, an electronic device may include at least one processor in addition to an antenna structure or an antenna module to be described later. The at least one processor may be configured to control such that not only an antenna module according to various embodiments of the disclosure operates, but also, in situations or conditions (e.g., above 6 GHz (FR2)) where an antenna module of the disclosure is used more effectively, an RF signal is processed by the corresponding antenna module.

As the frequency band to be used is higher, the frequency of use of antennas having the form of an array, in which multiple antennas are dense, is increasing. As an example, situations, in which a signal is transmitted through beamforming in a mmWave (e.g., above 6 GHz) band, is proposed. A base station may perform beamforming by utilizing multiple antenna arrays (e.g., four) in which multiple antennas (e.g., 256) are dense. As such, since implementations, in which multiple antennas are densely arranged, are expected, an antenna structure having increase in gain and spatial and economic efficiency in each antenna may be required. Referring to FIG. 1, the problem of the structure of the existing antenna module and the design direction of an antenna structure according to various embodiments of the disclosure will be described.

FIG. 1 illustrates an example of an antenna module including a layer structure of an antenna and a radio frequency integrated circuit (RFIC). For example, a layer structure may mean a structure in which some components in an antenna module are arranged on a PCB and other components are arranged on another PCB, and that is, the layer structure may mean a structure in which components are arranged on different layers.

Referring to FIG. 1, an antenna module 100 may include an RFIC 110, a package 120, and an antenna board 130. A bump 115 may be positioned between the RFIC 110 and the package 120. The bump 115 may connect the RFIC 110 and the package 120. A ball grid array (BGA) 125 may be positioned between the package 120 and the antenna board 130. The BGA 125 may connect the package 120 and the antenna board 130. The antenna board 130 may include a via vertically disposed with a feeding line for a connection therebetween.

A signal from the RFIC 110, after the processing by the package 120, may be radiated by an antenna of the antenna board 130. At this time, as illustrated in FIG. 1, loss may occur in the signal transmission process, by the feeding line and the via. For example, in one simulation result, it is identified that the loss 151 between the RFIC 110 and the package 120 is 0.3 dB, the loss 152 in the package 120 is 0.25 dB, the loss 153 between the package 120 and the antenna board 130 is 0.3 dB, the loss 154 of the via (e.g., a stacked via and a through-hole (e.g., a plate through-hole (PTH)) in the antenna board 130 is 1.2 dB, and the loss 155 of the feeding line in the antenna board 130 is 0.45 dB. As such, the feeding line and the vertical via due to the physical distance between the RFIC 110 and the antenna board 130 significantly affect the loss.

In order to improve performance thereof, it is required to reduce the loss of the feeding line in each antenna. As the problem raised in FIG. 1, there is feeding loss as much as the distance of the vertical via. Therefore, an antenna structure according to various embodiments of the disclosure may include a structure configured to reduce the distance from a chip (e.g., an RFIC) to an antenna in order to reduce the loss. The RFIC 110 may be mounted on the antenna board 130 (or a package is mounted thereon and the RFIC is mounted on the package) without a vertical via, and thus the antenna module can minimize the loss of due to feeding.

Before describing various embodiments of the disclosure, necessary elements, functions thereof, and terms thereof will be described. The antenna module may be a set including functional configurations for radiation of an RF signal, and may be configured in the form of a chip, equipment, or a package. First, the antenna module may include multiple antennas. Here, the form, in which multiple antennas are integrated, may be an antenna array. Each antenna included in an antenna array may be referred to as an array element or an antenna element. The antenna array may be configured in various forms such as a linear array or a planar array. An antenna array may be referred to as a massive antenna array. Each antenna element may be configured to radiate an RF signal, and the antenna array may form a radiation pattern.

An antenna module may include a board for providing an electrical connection. In the disclosure, a board may mean a printed circuit board (PCB) or a substrate configured to perform a similar function thereto. The board, on which the RFIC is mounted, may be referred to as a main board. According to an embodiment, the main board may be referred to as a radio unit (RU) board. The main board may include multiple signal lines. According to various embodiments, each antenna element may be disposed on the main board. The board including antenna elements may be referred to as an antenna board. That is, according to various embodiments, the main board may perform the function of the antenna board. As such, the board in which the RFIC is mounted on the antenna board and thus which configured to provide mixed functions, may be referred to as a hybrid main board.

An antenna module may include an RFIC. The RFIC may perform functions for processing RF signals, and may convert an RF signal into a baseband signal or convert a baseband signal into an RF signal. The RFIC may include multiple signal paths for each antenna element. In addition, the RFIC may include a transmission filter, a reception filter, an amplifier, a mixer, an oscillator, a digital to analog converter (DAC), an analog to digital converter (ADC), and the like. The RFIC according to various embodiments of the disclosure may be configured to process not only an RF signal of the Sub6 band (e.g., about 6 GHz or less) but also an RF signal above the 6 band (e.g., about 6 GHz-about 60 GHz). Meanwhile, in the disclosure, the RFIC is used as a generic term for a communication circuit for processing an RF signal. That is, in the embodiments referred to as the RFIC, the RFIC may not be limited to referring to a specific implementation method.

In some embodiments, the antenna module may include a package. The package may be a set of components configured to additionally perform the processing for signals of the RFIC. For example, the package may perform power control or phase arrangement control of a signal. The package may include one or more RF paths and one or more elements for an RF signal process.

Unlike the existing structure described in FIG. 1, the antenna structure according to various embodiments of the disclosure may provide a structure for minimizing loss due to the vertical length of a vertical via passing through a PCB substrate between the RFIC and the antenna. In order to fundamentally reduce the loss which occurs in an antenna package structure of mmWave, it will be described that a method of sharing a main board on which the RFIC is mounted and a board associated with a radiation body configured to radiate an RF signal is described. In other words, the main board may be configured to include a radiation body (that is, to perform the function an antenna board also).

Figure 2:
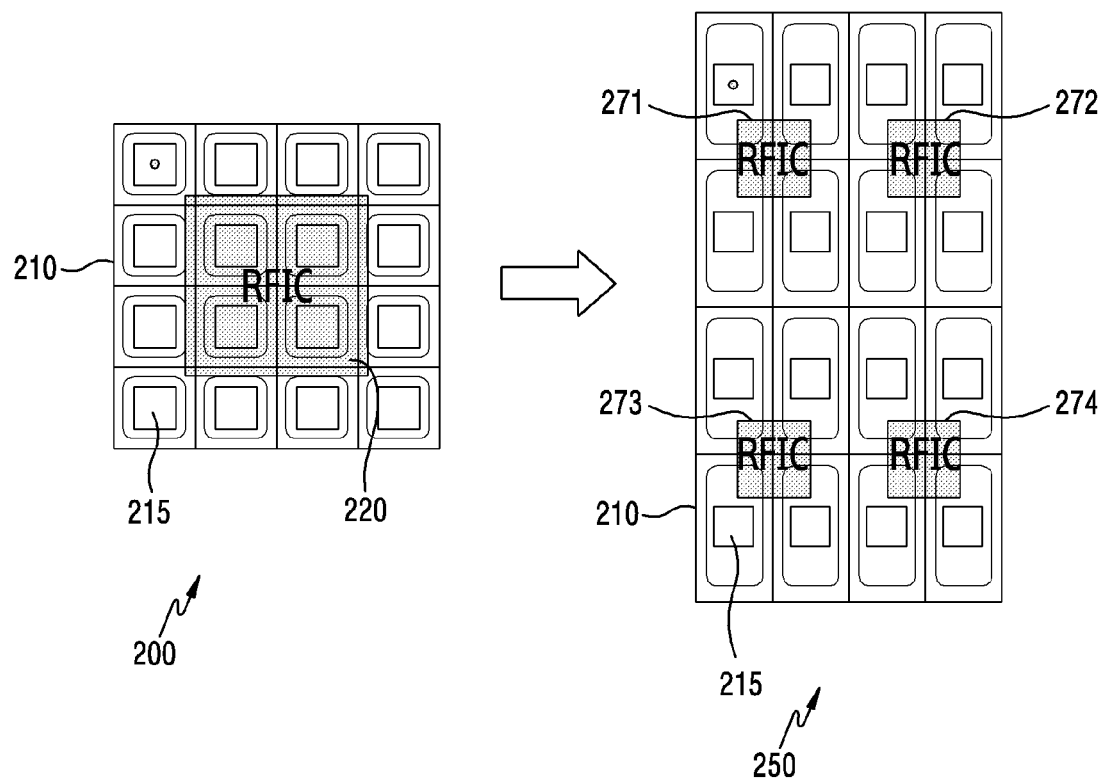
FIG. 2 illustrates an example of an antenna module having a coplanar arrangement structure of an antenna and an RFIC according to various embodiments of the disclosure.

FIG. 2 illustrates an example of an antenna module having a coplanar arrangement structure of an antenna and an RFIC according to various embodiments of the disclosure. A coplanar arrangement structure of the disclosure may be a structure in which an antenna and an RFIC are disposed on the same surface in a board, and disposed at positions spaced apart from each other on the same surface. Antenna elements may be arranged in one side of the board, and the RFIC may be disposed in the one side. That is, the antenna elements and the RFIC may be arranged to be spaced apart from each other. The structure may aim to reduce the physical distance between two elements (the antenna and the RFIC) and to reduce the loss due to feeding. Unlike a PCB, on which an RFIC is disposed, configured to form a stacked structure with a PCB, on which an antenna is disposed, or unlike a structure in which an RFIC is positioned on the lower surface opposite to the upper surface of a PCB on which an antenna is disposed, the coplanar arrangement structure may mean a structure in which an RFIC and an antenna are arranged on the same surface of a board. In some embodiments, an RFIC and an antenna may be positioned on the same layer between a surface on which an antenna is disposed and a surface on which a PCB is disposed, without a separate substrate.

Referring to FIG. 2, an existing antenna module 200 has an RFIC 220 having an area larger than the gap between each antenna element 215, and thus it is difficult to mount same on the same surface of a board. The area of one surface of a board 210 is limited. Therefore, when the antenna elements 215 have been mounted thereon, it is difficult to dispose the RFIC 220 on the remaining space of the board due to the size and the shape thereof. In other words, it is difficult that the RFIC 220 is disposed on the same surface with the board 210. In order to reduce feeding loss, although a configuration, in which an antenna is disposed at the upper end in the same printed circuit board (PCB) and an RFIC is disposed at the lower end thereof, is considered, the feeding loss due to the distance corresponding to the thickness of the PCB may still exist. Therefore, in order to arrange an RFIC and an antenna on the same surface of a board, it is required to increase the gap between antenna elements or to decrease the size of the RFIC. Hereinafter, a structure, in which an RFIC is mounted in the space between antenna elements for an array antenna, will be described.

In order that an RFIC is disposed between the space between antenna elements, it may be required that a mounting area in a main board (e.g., the board 210) of an RFIC is smaller than the gap between antenna elements. Extension of the gap between antenna elements in order to secure sufficient gain or miniaturization of an RFIC due to low power may enable an RFIC to be disposed between antenna elements. That is, when the size of an RFIC is relatively smaller than the gap between antenna elements, an antenna module may include an RFIC disposed in the gap between antenna elements. According to an embodiment, the miniaturization of an RFIC may be implemented by an RFIC having reduced number of antenna elements or an RFIC having reduced signal process functions (e.g., other functions are performed by a separate component (e.g., package)). For example, in an antenna module 250, the area of a first RFIC 271, a second RFIC 272, a third RFIC 273, or a fourth RFIC 274 is smaller than the gap between each antenna element 215, and thus same may be mounted in the same layer. Unlike the RFIC 220 connected to 16 antenna elements so as to perform a signal process, each RFIC may perform a signal process for 4 antenna elements so as to implement the miniaturization of the RFIC. Particularly, a small RFIC connected for relatively few antenna elements not only may be operated with low power but also may be miniaturized, and thus may enable the arrangement.

As a mounting area decreases, an antenna module may include an RFIC disposed in the gap between antenna elements. A board (hereinafter, an antenna board) including an antenna may include multiple antenna elements. Each antenna element may form a radiation pattern. An RFIC for an antenna may be disposed between the radiation patterns so as not to interfere with the radiation of each antenna element. An RFIC may be mounted on a surface facing the same direction as one surface of a board on which an antenna is disposed, and in the one surface, an area, on which the RFIC is mounted, may not overlap an area in which the antenna is disposed. In other words, the mounting area of the antenna may be different from the mounting area of the RFIC.

An antenna structure having a coplanar arrangement according to various embodiments of the disclosure may be configured to maximally reduce the length of a vertical via or a feeding line passing through one or more layers so as to provide performance improvement due to reduced feeding loss. Therefore, as illustrated in FIG. 1, a vertical via (or a through-hole) may not be required so that insertion loss due to feeding is reduced. An antenna module may obtain improved communication gain through a structure in which an antenna radiation pattern is disposed on the same surface of a main board on which an RFIC (e.g., the first RFIC 271, the second RFIC 272, the third RFIC 273, or the fourth RFIC 274) is disposed. An antenna structure having a coplanar arrangement may be a structure in which an RFIC is mounted on a main board including antenna elements upside down compared to an existing stacked structure.

In FIG. 2, although multiple RFICs and multiple antenna elements are included in the antenna module 250, this may be only one implementation example, and embodiments of the disclosure may not be limited thereto. The antenna module 250 may be only one configuration example for an antenna and an RF signal process, and multiple antenna modules may be implemented in a base station. That is, some of the 16 antenna elements and 4 RFICs of FIG. 2 may be implemented by a first antenna module, and the other some may be implemented by a second antenna module. For example, in a first PCB, two RFICs may be arranged to be spaced apart from each other on one surface thereof, and eight antenna elements may be arranged on the same surface. In addition, for example, in a second PCB, the other two RFICs may be arranged to be spaced apart from each other on one surface thereof, and the other eight antenna elements may be arranged on the same surface. That is, antenna modules may not form different layers, multiple antenna modules each may be separately produced, and a base station may include an antenna structure in which each antenna module is formed in one assembly.

Although not illustrated in FIG. 2, according to an embodiment, a package may be included between an RFIC and an antenna board. The RFIC and the package may be mounted on a surface facing the same direction as one surface of a board on which an antenna is disposed. At this time, an area, in which the package is mounted on the one surface, may not overlap an area, in which an antenna is disposed. That is, a mounting area of the antenna may be different from a mounting area of the package.

Hereinafter, although a patch antenna is illustrated in the drawings of the disclosure as an example, various embodiments of the disclosure may not be limited thereto. Other type of antennas may be used in the same or a similar manner. In addition, although a ball grid array (BGA) for connection between a board and a package, between a board and an RFIC, or between a package and an RFIC is illustrated as an example, various embodiments of the disclosure may not be limited thereto. Other methods may be used for surface mounting in addition to the BGA. For example, an integration method such as a pin grid array (PGA), a land grid array (LGA), a thin quad flat pack (TQFP) may be used for connection between a board and a package, between a board and a RFIC, or between a package and a RFIC.

Figure 3A:
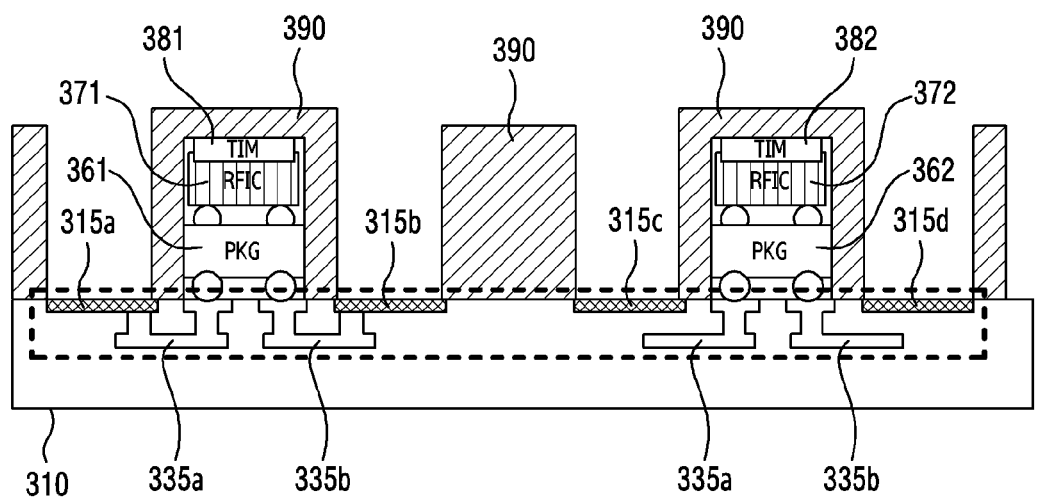
FIG. 3A illustrates an example of a coplanar arrangement structure of an antenna and an RFIC according to various embodiments of the disclosure.

FIG. 3A illustrates an example of a coplanar arrangement structure of an antenna and an RFIC according to various embodiments of the disclosure. FIG. 3A illustrates a cross-section of an antenna module having a coplanar arrangement structure illustrated in FIG. 2.

Referring to FIG. 3A, an antenna module may include a main board 310, antenna elements 315a, 315b, 315c, and 315d, a feeding line 335a, 335b, 335c, and 335d, a package 361 and 362, an RFIC 371 and 372, a thermal interface material (TIM) 381 and 382, and a cover structure 390.

The main board 310 may include each antenna element. The antenna element may be disposed on one surface (e.g., the upper surface) of the main board 310 and may form a radiation pattern. For example, the main board 310 may include a first antenna element 315a, a second antenna element 315b, a third antenna element 315c, and a fourth antenna element 315d.

The main board 310 may include the package and the RFIC. The package and the RFIC may be arranged on the one surface (e.g., the upper surface) of the main board 310. Hear, the one surface may be the same surface as a surface on which the antenna element is disposed. On the other hand, the package and the RFIC may be mounted in an area different from an area in which the antenna element is disposed, on the same surface. That is, surfaces, with which the package and RFIC are in contact, may be different from a surface with which the antenna element is contact. The antenna and the RFIC may be arranged in an area in which the antenna and the RFIC do not overlap on the same surface such that the radiation pattern of the antenna less influences thereon.

A first package 361 may be mounted on the main board 310, and a first RFIC 371 may be mounted on the first package 361. According to an embodiment, the connection between the main board 310 and the first package 361 and the connection between the first package 361 and the first RFIC 371 may be integrated by the ball grid array (BGA) (The BGA may be merely an example, and other integration methods such as the land grid array (LGA) may be used therefor). According to an embodiment, the first RFIC 371 may further include a first TIM 381 for thermal control of the first RFIC 371. A second package 362 may be mounted on the main board 310, and a second RFIC 372 may be mounted on the second package 362. According to an embodiment, the connection between the main board 310 and the second package 362 and the connection between the second package 362 and the second RFIC 372 may be integrated by the ball grid array (BGA) (The BGA may be merely an example, and other integration methods such as the land grid array (LGA) may be used therefor). According to an embodiment, the second RFIC 372 may further include a second TIM 382 for thermal control of the second RFIC 372.

The space between antenna elements may be defined in various ways. In some embodiments, in the case of a linear array, the space may mean a space between two antenna elements. In addition, in some embodiments, in the case of a two-dimensional array antenna, the space may be a space in a closed curve formed between four antenna elements. For example, it is assumed that each antenna element of an antenna array is the same. In a two-dimensional antenna array, when the vertical distance (e.g., the distance between the lower end of one antenna element and the upper end of the other antenna element) between the two antenna elements is v, and the horizontal distance (e.g., the distance between the right end of one antenna element and the left end of the other antenna element) is h, an area S, on which the RFIC or the package is mountable, may be defined in the following equation $S=(h-a)\times(v-b)$. Here, the a and b represent a spatial margin, and may be a margin value for a cover structure to be described later or a design margin value for not being affected by the radiation pattern. The antenna module may include the RFIC/package disposed in the S.

The first RFIC 371 and the first package 361 may be disposed in the space between the first antenna element 315a and the second antenna element 315b. The second RFIC 372 and the second package 362 may be disposed in the space between the third antenna element 315c and the fourth antenna element 315d. FIG. 3A is a cross-sectional view, and when seen from a specific direction, they may be arranged on the same axis. However, actually, as the antenna module 250 of FIG. 2, they may be arranged in a closed curve space formed by the antenna elements on a two-dimensional space.

Each the package and the RFIC may be connected to the antenna elements. The main board 310 may include the multiple feeding lines in order for the connection. The multiple feeding lines may include a first feeding line 335a, a second feeding line 335b, a third feeding line 335c, and a fourth feeding line 335d. According to an embodiment, the feeding lines may be implemented in the main board 310 and may be directly connected to the radiation body. For example, the first feeding line 335a may provide a direct connection between the first antenna element 315a and the first RFIC 371 (or the first package 361). The second feeding line 335b may provide a direct connection between the second antenna element 315b and the first RFIC 371 (or the first package 361). In addition, according to an embodiment, the feeding lines may be implemented in the main board 310 and may be connected to the radiation body in a coupling manner. For example, the third feeding line 335c may provide an electrical connection between the third antenna element 315c and the second RFIC 372 without a direct contact with the third antenna element 315c in an electromagnetic (EM) manner (e.g., an alternating current (AC) coupling). The fourth feeding line 335d may provide an electrical connection between the fourth antenna element 315d and the second RFIC 372 without a direct contact with the fourth antenna element 315d in an electromagnetic manner.

An RFIC may be sensitive to heat, and thus may essentially require thermal management. An electronic device including an RFIC is sensitive to heat. Therefore, when the problem of sensitivity to heat is not removed or mitigated, there is a problem in that the lifetime of the RFIC is reduced. In order for the thermal management, a path for dissipating heat of the RFIC is required in view of the design of the antenna module. The antenna module may include a structure for a heatsink. A heatsink may be referred to as a structure/function which absorbs and transfers heat from and to other objects by using direct or indirect thermal contact.

According to various embodiments, the antenna module may include the cover structure 390 disposed to cover the RFIC. According to an embodiment, the cover structure 390 may be made of a metal material for thermal control. The cover structure 390 may be disposed to cover an area which does not overlap the antenna elements of the main board 310, that is, an area which does not overlap the antenna elements when the upper surface of the main board 310 is seen from above (e.g., FIG. 3C). The cover structure 390 may be disposed in a shape protruding from the main board 310. The cover structure 390 may be disposed to cover the RFIC and the package, outside the mounting area of the antenna elements of the main board 310. Accordingly, the area corresponding to the radiation pattern of the antenna may be in an open state (opening). In addition, according to an embodiment, the cover structure 390 may be made of a metal material for thermal control. In addition, in some embodiments, the antenna module may further additionally include the TIM (e.g., the first TIM 381 and the second TIM 382) for thermal management.

Although the TIM is illustrated in FIG. 3A, in implementing the implementation of the disclosure, the TIM it is merely an exemplary configuration for heat treatment, and is not necessarily an essential configuration. That is, various embodiments of the disclosure may not be limited thereto. A structure, in which the metal structure 390 is disposed immediately after the RFIC, may also be understood as an embodiment of the disclosure.

Figure 3B:
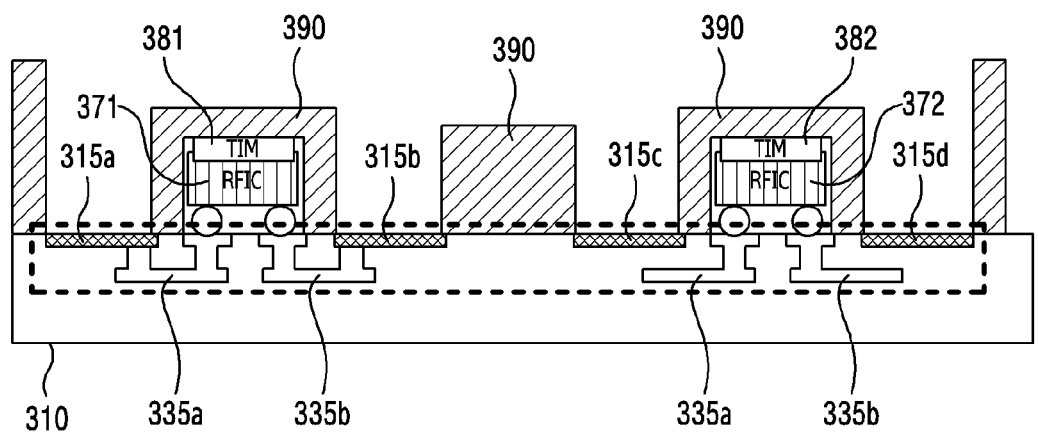
FIG. 3B illustrates another example of a coplanar arrangement structure of an antenna and an RFIC according to various embodiments of the disclosure.

FIG. 3B illustrates another example of a coplanar arrangement structure of an antenna and an RFIC according to various embodiments of the disclosure. FIG. 3B illustrates a cross section of an antenna module having a coplanar arrangement structure illustrated in FIG. 2. In an example of the coplanar arrangement structure of FIG. 3B, the antenna module may include a structure in which each RFIC is directly connected to the main board without being used an intermediate package board by the RFIC, differently from the example of FIG. 3A.

Referring to FIG. 3B, the antenna module may include the main board 310, the antenna elements 315a, 315b, 315c, and 315d, the feeding line 335a, 335b, 335c, and 335d, the RFIC 371 and 372, the thermal interface material (TIM) 381 and 382, and the cover structure 390. The first RFIC 371 may be mounted on the main board 310. According to an embodiment, the connection between the main board 310 and the first RFIC 371 may be integrated by the ball grid array (BGA) (The BGA may be merely an example, and other integration methods such as the land grid array (LGA) may be used therefor). According to an embodiment, the first RFIC 371 may further include the first TIM 381 for thermal control of the first RFIC 371. The second RFIC 372 may be mounted on the main board 310. According to an embodiment, the connection between the main board 310 and the second RFIC 372 may be integrated by the BGA (The BGA may be merely an example, and other integration methods such as the LGA may be used therefor). According to an embodiment, the second RFIC 372 may further include the second TIM 382 for thermal control of the second RFIC 372. Descriptions of other configurations may be applied in the same manner as or a similar manner to FIG. 3A.

Figure 3C:
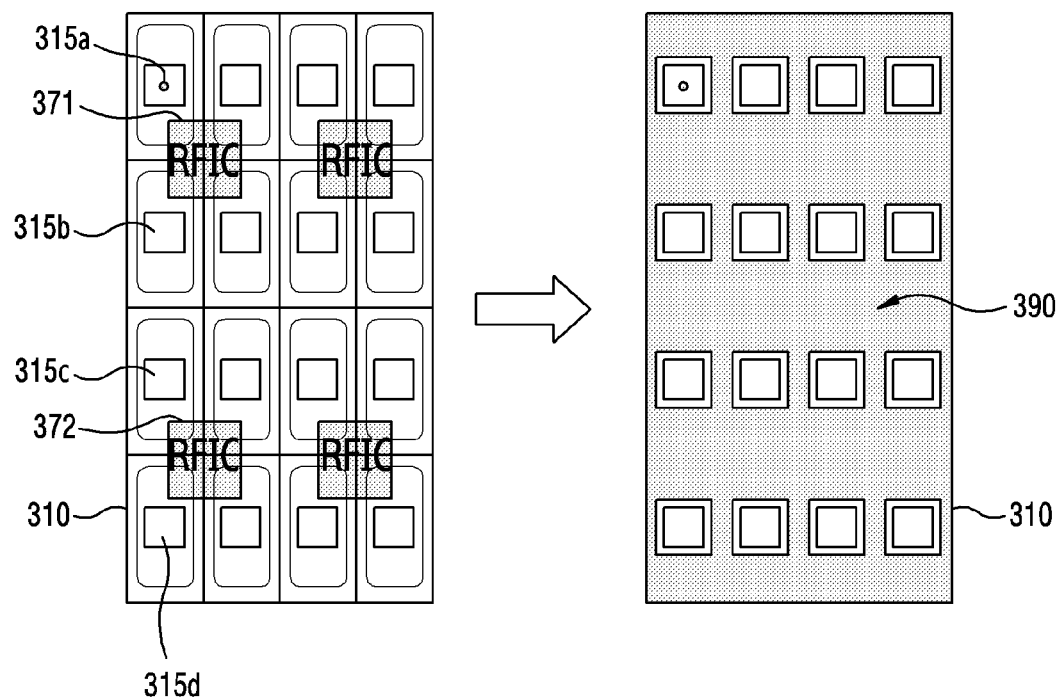
FIG. 3C illustrates an example of a cover structure for an antenna module according to various embodiments of the disclosure.

FIG. 3C illustrates an example of a cover structure for an antenna module according to various embodiments of the disclosure. The cover structure is illustrated as the cover structure 390 of FIG. 3A and FIG. 3B. The cover structure 390 may be made of a metal material for thermal control.

Referring to FIG. 3C, when the main board 310 is seen from above, the cover structure may be disposed to cover an area, in which the antenna elements are mounted, and other spaces. The cover structure 390 may be disposed to cover each RFIC while avoiding the radiation pattern, and thus the function of the heatsink may be shared. According to an embodiment, the cover structure 390 may be disposed to cover a space corresponding to the distance spaced apart from the boundary between each antenna element by a predetermined distance. The cover structure may be disposed such that a portion corresponding to a radiation area of the antenna corresponds to the opening, so as not to affect the radiation performance.

As the RFIC becomes smaller, rather than one RFIC being connected to all multiple antenna elements, as the antenna module 250 of FIG. 2, two or more RFICs may be respectively connected to the antenna elements in different subsets within the multiple antenna elements. For example, the first RFIC may be connected to each of the antenna elements of a first group by the feeding line, and the second RFIC may be connected to each of the antenna elements of the second group by the feeding line. In this case, a mounting area, on which the RFIC is mountable, may be in the closed curve area formed by the antenna elements of the corresponding group. That is, the first RFIC may be mounted in a closed curve area formed by the antenna elements of the first group. In addition, the second RFIC may be mounted in a closed curve area formed by the antenna elements of the second group. At this time, each closed curve area may be an area spaced apart from the antenna elements by a predetermined distance or more. In order not to affect the radiation performance of the antenna elements, the area, on which the RFIC is mounted, may be disposed over a predetermined distance from the area of the radiation body. According to an embodiment, the predetermined distance may be designed based on at least one of performance of the radiation body, the frequency band of the RF signal, and the size of the antenna element.

In FIG. 2 to FIG. 3B, examples, in which the RFIC is mounted in the space between the antenna elements, have been described. That is, the RFIC may not be formed on a layer different from a board to which the antenna elements are attached and may be positioned on the same layer as the board to which same is attached, to reduce the physical distance therebetween. As the physical distance decreases, the feeding loss decreases. Based on the principle, the antenna elements may not be arranged on the main board on which the RFIC is mounted, and a structure configured to perform the function of the antenna may be formed on the main board. Therefore, the antenna structure for reducing the feeding loss may be considered. Hereinafter, in FIG. 4 to FIG. 6, embodiments of an antenna structure including a cavity-back structure by forming a cavity in the board will be described.

Figure 4:
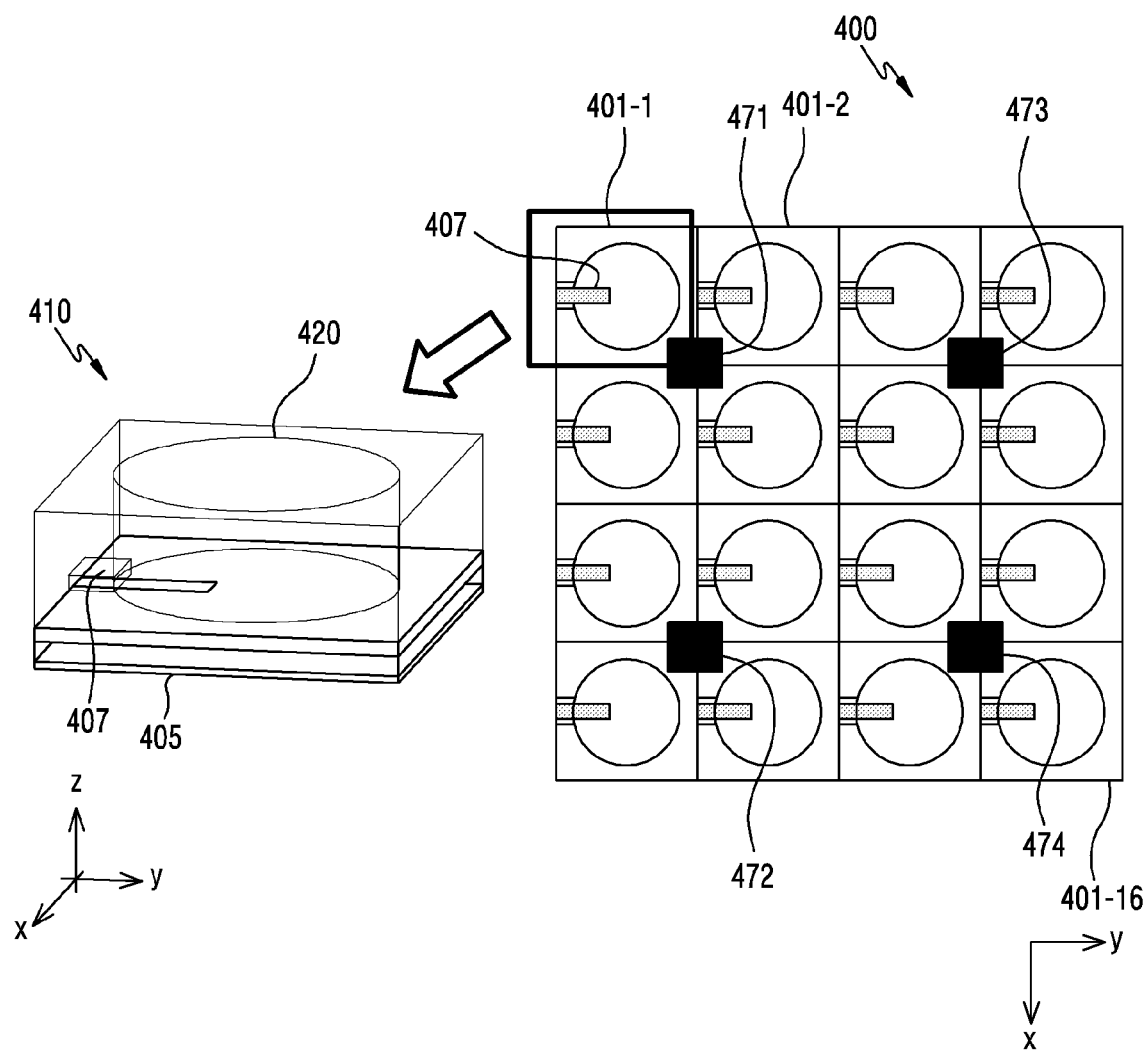
FIG. 4 illustrates an example of an antenna module having a cavity-back structure according to various embodiments of the disclosure.

FIG. 4 illustrates an example of an antenna module having a cavity-back structure according to various embodiments of the disclosure. Two-dimensional antenna array including 4×4 antennas will be described as an example.

Referring to FIG. 4, an antenna module 400 may include multiple cavities 401-1, 401-2, . . . , and 401-16. The multiple cavities 401-1, 401-2, . . . , and 401-16 may be arranged on a main board 410 of the antenna module 400. RFICs 471, 472, 473, and 474 may be arranged on the main board 410 of the antenna module 400. In this case, each RFIC may be mounted on the main board 410, and each cavity may be formed in a metal layer of the main board 410. The cavities may be respectively electrically connected to the RFICs through feeding lines 407. In this case, each cavity and adjacent structures may be arranged to reflect and radiate an RF signal. Specifically, the signal provided through the feeding line may be reflected by a reflection plate 405, and the reflected signal may be radiated into the air.

Hereinafter, in connection with descriptions of each cavity structure, although the cavity 401-1 is described as an example thereof, the corresponding descriptions may be equally applied to other cavities 401-2, 401-3, . . . , and 401-16. The cavity 401-1 may be cylindrical shape. A cylindrical tube 420 may be positioned in the main board 410 in addition to the feeding line 407. According to an embodiment, air or a dielectric material may be positioned inside the cylindrical tube. An RF signal may be reflected through the cavity and then may be radiated into the air. For the reflection of an RF signal, the reflection plate 405 may be positioned in the main board 410.

In FIG. 4, although it is described that the multiple RFICs are arranged in the antenna module 400, and the multiple cavities are included in the main board, this may be merely one implementation example, and embodiments of the disclosure may not be limited thereto. The antenna module 400 may be only one configuration example for an antenna and an RF signal process, and multiple antenna modules may be implemented in a base station. That is, some of the 16 cavities and four RFICs of FIG. 2 may be implemented by the first antenna module, and the other some may be implemented by the second antenna module. For example, in the first PCB, two RFICs may be arranged to be spaced apart from each other on one surface thereof, and eight cavities may be formed through vias inside the first PCB. In addition, for example, in the second PCB, two RFICs may be arranged to be spaced apart from each other on one surface thereof, and other eight cavities may be formed through vias inside the first PCB. That is, different layers between antenna modules may not be formed, multiple antenna modules each may be separately produced, and a base station may include an antenna structure in which each of the antenna modules is formed in one assembly.

In FIG. 4, although the cylindrical cavity has been described as an example, various embodiments of the disclosure are not limited thereto. For example, multiple quadrilateral cavities (slots) may be formed in the main board.

According to various embodiments of the disclosure, in order to reduce the distance between the main board, on which the RFIC is mounted, and the radiation body, the cavity may be formed on the main board to propose an antenna structure which allows reduction of feeding loss. In order to form the cavity on the main board, a method for forming the cavity inside the layer of the main board 400 may be provided. Hereinafter, in the disclosure, referring to FIG. 5A to FIG. 5B, examples, in which a via process is performed in the main board 400, will be described. The main board, on which the RFIC is mounted, and the antenna, may be shared as much as possible, to provide the antenna having the cavity-back structure having reduced cost and efficient performance.

Figure 5A:
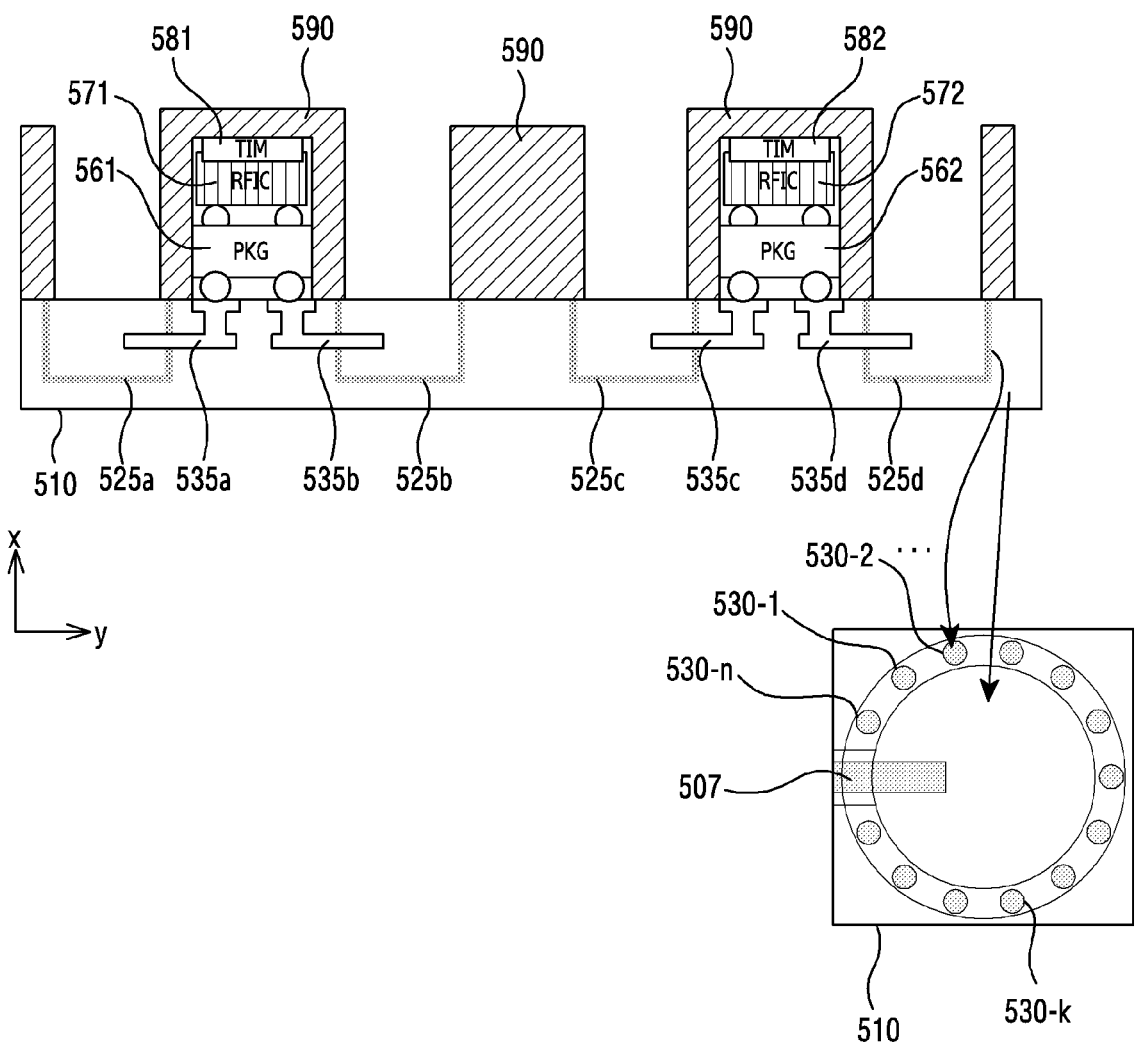
FIG. 5A illustrates an example of a cavity-back structure according to various embodiments of the disclosure.

FIG. 5A illustrates an example of a cavity-back structure according to various embodiments of the disclosure. FIG. 5A illustrates a cross section of an antenna module having a cavity-back structure illustrated in FIG. 4.

Referring to FIG. 5A, an antenna module may include a main board 510, a cavity 525a, 525b, 525c, and 525d, a feeding line 535a, 535b, 535c, and 535d, a package 561 and 562, an RFIC 571 and 572, a thermal interface material (TIM) 581 and 582, and a cover structure 590. A first package 561 may be mounted on the main board 510, and a first RFIC 571 may be mounted on the first package 561. According to an embodiment, the connection between the main board 510 and the first package 561 and the connection between the first package 561 and the first RFIC 571 may be integrated by the ball grid array (BGA) (The BGA may be merely an example, and other integration methods such as the land grid array (LGA) may be used therefor). According to an embodiment, the first RFIC 571 may further include a first TIM 581 for thermal control of the first RFIC 571. A second package 562 may be mounted on the main board 510, and a second RFIC 572 may be mounted on the second package 562. According to an embodiment, the connection between the main board 510 and the second package 562 and the connection between the second package 562 and the second RFIC 572 may be integrated by the ball grid array (BGA) (The BGA may be merely an example, and other integration methods such as the land grid array (LGA) may be used therefor). According to an embodiment, the second RFIC 572 may further include a second TIM 582 for thermal control of the second RFIC 572.

The main board 510 may include the multiple feeding lines. The multiple feeding lines may include a first feeding line 535a, a second feeding line 535b, a third feeding line 535c, and a fourth feeding line 535d. According to an embodiment, the feeding lines may be implemented in the main board 510 and may be provide an RF signal on the cavity. The signal provided by the feeding line may be radiated based on structural resonance inside the cavity. The RF signal reflected from the cavity may be radiated into the air.

The main board 510 may include multiple cavities 525a, 525b, 525c, and 525d. Hereinafter, in connection with descriptions of each cavity, although the cavity 525d is described as an example, the corresponding descriptions may be equally applied to other cavities 525a, 525b, and 525c. The main board 510 may include multiple vias (or holes) therein. Each cavity may have a via (or a hole) formed through a metal layer inside the board and thus have a space. Multiple vias may be formed through the via process. At this time, in order to have a structure equivalent to the cavity made of an actual metal, the vias may be required to be sufficiently densely formed. According to an embodiment, the gap between the vias may be a predetermined value or less. The reason is that when the vias are densely formed, the vias perform the same function as one surface thereof. The vias may be coupled to one or more metal layers to generate the cavity between the one or more metal layers of the main board 510. The vias may be positioned from the upper layer to the lower layer of the main board 510, and the cavity 525d may be formed through the surface of the upper layer surface, the surface of the lower layer surface, and the vias. That is, the antenna may have the cavity-back structure formed by substantially three surfaces. According to an embodiment, the space, in which same is formed, may have a dielectric therein, or may be an empty space in which only air exists.

The main board 510 may include the package and the RFIC. The package and the RFIC may be arranged on one surface (e.g., the upper surface) of the main board 510. Each the package and each the RFIC may be mounted on the main board 510 in the +y-axis direction with reference to the main board 510. At this time, the cavities 525a, 525b, 525c, and 525d may be positioned in the −y-axis direction with reference to the main board 510. The area, in which the package or the RFIC is mounted on the main board 510, may be the space between the cavities. In other words, each cavity may be formed in an area different from an area in which the package is mounted on the main board 510. For example, the first package 561 may be mounted on the area between the first cavity 525a and the second cavity 525b, and the first RFIC 571 may be mounted on the first package 561. The second package 562 may be mounted on the area between the third cavity 525c and the fourth cavity 525d, and the second RFIC 572 may be mounted on the second package 562.

The space between the cavities may be defined in various ways. In some embodiments, in the case of a linear array, the space may mean a space between two cavities. In addition, in some embodiments, in the case of a two-dimensional array antenna, the space may be a space in a closed curve formed between four cavities. For example, it is assumed that each cavity of the antenna array is the same. In a two-dimensional antenna array, when the vertical distance (e.g., the distance between the lower end of one cavity and the upper end of the other cavity) between the two cavities is v, and the horizontal distance (e.g., the distance between the right end of one cavity and the left end of the other cavity) is h, an area S, on which the RFIC or the package is mountable, may be defined in the following equation S=(h−a)×(v−b). Here, the a and b represent a spatial margin, and may be a margin value for a cover structure to be described later or a design margin value for not being affected by the radiation pattern. The antenna module may include the RFIC/package disposed in the S.

According to various embodiments, the antenna module may include a cover structure 590 disposed to cover the RFIC. According to an embodiment, the cover structure 590 may be made of a metal material for thermal control. The cover structure 590 may be disposed to cover an area which does not overlap the cavities of the main board 510, that is, an area (e.g., an area in which the via is formed) which does not overlap the antenna cavities when the upper surface of the main board 510 is seen from above. The cover structure 390 may be disposed in a shape protruding from the main board 510. The cover structure 590 may be disposed to cover the RFIC and the package, outside the mounting area of the antenna elements of the main board 510. Accordingly, the area corresponding to the radiation pattern of the antenna may be in an open state (opening). In addition, according to an embodiment, the cover structure 590 may be made of a metal material for thermal control. In addition, in some embodiments, the antenna module may further additionally include the TIM (e.g., the first TIM 581 and the second TIM 582) for thermal management.

Instead of an antenna (e.g., a patch antenna) in which the radiation pattern is formed on the main board, the antenna may be implemented by the cavity-back structure. An antenna having a cavity-back structure may be implemented by a feeding structure (e.g., the feeding lines 535a, 535b, 535c, and 535d), a metal structure (e.g., the cover structure 590), and the reflection plate. The metal layer in the main board may function as the reflection plate, and thus the main board and the reflection plate may be shared. The side surface formed by the vias of the main board and the metal-side surface in the main board may have an electromagnetic wave shielding structure. By the feeding line and the cavity-back structure (the cavity and the cover structure), the physical distance between the RFIC and the cavity may be reduced, thereby improving the radiation performance. In addition, in addition to the existing electromagnetic wave shield structure, that may also function as a radiation body, and thus the antenna module may be further miniaturized.

Although the TIM is illustrated in FIG. 5A, in implementing the implementation of the disclosure, the TIM is merely an exemplary configuration for heat treatment, and is not necessarily an essential configuration. That is, various embodiments of the disclosure may not be limited thereto. A structure, in which the metal structure 590 is disposed immediately after the RFIC, may also be understood as an embodiment of the disclosure.

Figure 5B:
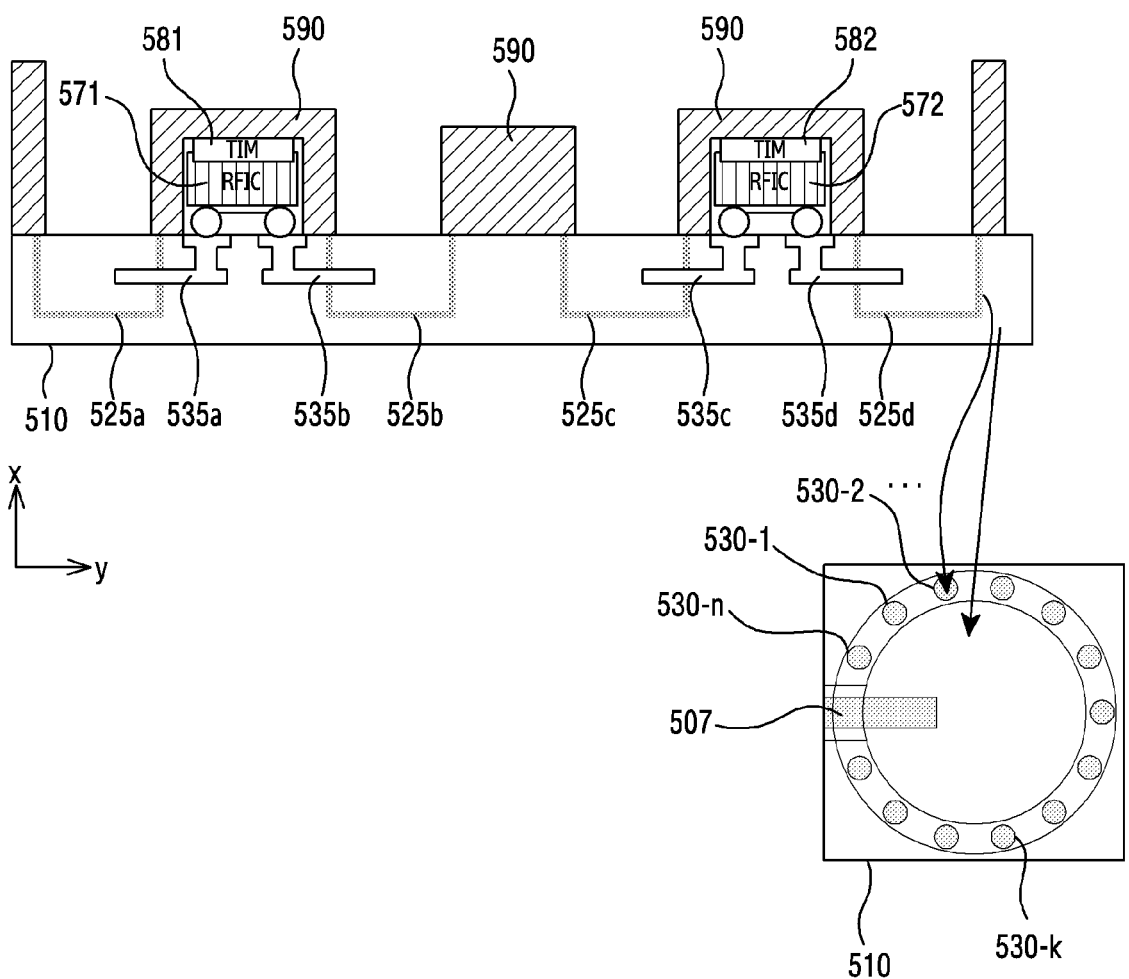
FIG. 5B illustrates another example of a cavity-back structure according to various embodiments of the disclosure.

FIG. 5B illustrates another example of a cavity-back structure according to various embodiments of the disclosure. FIG. 5A illustrates a cross section of an antenna module having a cavity-back structure illustrated in FIG. 4. Here, in an example of the cavity-back structure of FIG. 5B, the antenna module may include a structure in which each RFIC is directly connected to the main board without being used an intermediate package board by the RFIC, differently from the example of FIG. 5A.

Referring to FIG. 5B, the antenna module may include the main board 510, the cavity 525a, 525b, 525c, and 525d, the feeding line 535a, 535b, 535c, and 535d, the RFIC 571 and 572, the thermal interface material (TIM) 581 and 582, and the cover structure 590. The first RFIC 571 may be mounted on the main board 510. According to an embodiment, the connection between the main board 510 and the first RFIC 571 may be integrated by the BGA. According to an embodiment, the first RFIC 571 may further include the first TIM 581 for thermal control of the first RFIC 571. The second RFIC 572 may be mounted on the main board 510. According to an embodiment, the connection between the main board 510 and the second RFIC 572 may be integrated by the BGA. According to an embodiment, the second RFIC 572 may further include the second TIM 582 for thermal control of the second RFIC 572. Descriptions of other configurations may be applied in the same manner as or a similar manner to FIG. 5A.

Figure 6:
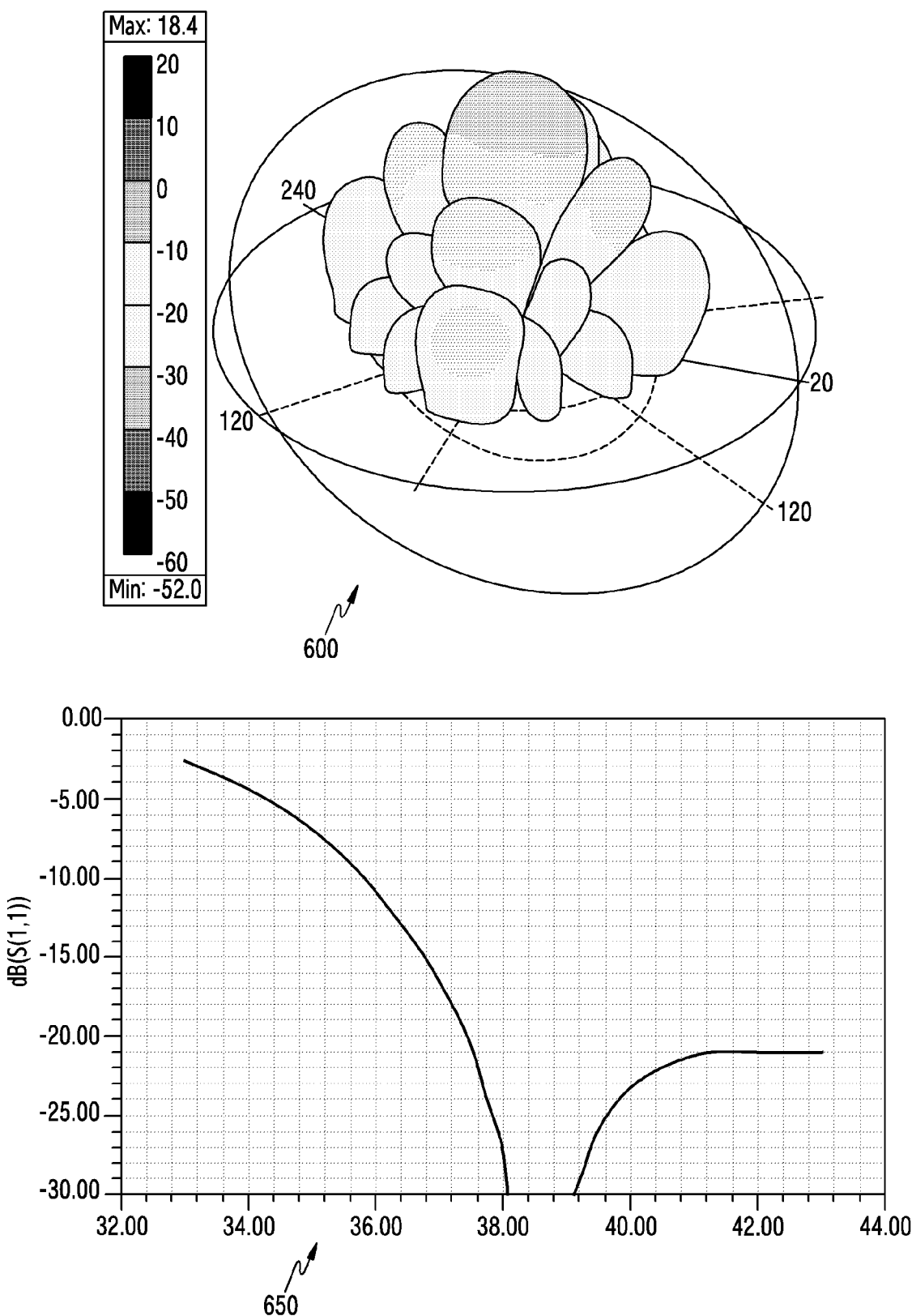
FIG. 6 illustrates an example of performance of an antenna module having a cavity-back structure according to various embodiments of the disclosure.

FIG. 6 illustrates an example of performance of an antenna module having a cavity-back structure according to various embodiments of the disclosure. The antenna module may be an array antenna including 4×4 antenna elements, and may be designed to operate in the 39 GHz frequency band. The antenna module may include a waveguide metal and a structure having a substrate integrated waveguide cavity.

Referring to FIG. 6, a form diagram 600 illustrates the radiation pattern of the antenna module. The antenna array may obtain a gain of up to 18.4 dBi (about: 98% efficiency). In addition, the graph 600 illustrates the relationship between an S11 which is an input reflection coefficient, and a frequency. The horizontal axis represents the frequency (unit: GHz), and the vertical axis represents the S11 (unit: dB). An operating frequency may be designed to be maximized at 39 GHz, and when considering the reflection coefficient (e.g., voltage standing wave ratio (VSWR)>2), the antenna module may provide a wide bandwidth of 6 GHz or more.

According to various embodiments of the disclosure, the physical distance between the radiation body of the antenna and the RFIC for the baseband signal process, may be minimized, and thus an antenna module, which can reduce feeding loss and improve communication performance, may be proposed. The antenna module may be referred to as the antenna package, and may be also referred to as all other equipment including the radiation body and the RFIC, an element of the equipment, a chip, and the like.

In the disclosure, in order to reduce the feeding loss, structures for reducing the layers positioned between the radiation body and the RFIC have been described. According to various embodiments, the RFIC may be mounted in the space between the antenna elements on the same plane surface (e.g., the upper surface of the PCB) (or the antenna elements may be mounted between the RFICs), and thus the feeding loss can be reduced compared to the existing layer structure. Particularly, the radiation body may be disposed on the main board including an RF signal processing circuit, or the radiation body may be implemented in the inside thereof (e.g., the cavity-back structure), so that the physical distance is reduced. In addition, the cover structure (e.g., the metal structure) may be housed to cover the RFIC area in order for additional thermal control. The cover structure not only may assist the function of the radiation body, but also may perform the function of the heatsink, and thus can affect the miniaturization of the product.

The structure, in which they are mounted on different layers, may cause not only feeding loss but also process errors. Particularly, in a structure in which multiple antennas are dense, the process errors may cause significant cumulative tolerance. Therefore, in order to facilitate mass production, it may be required to minimize the process error of each antenna product and reduce the cumulative tolerance. In view of cost reduction for mass production, instead of a structure in which a module is produced by stacking multiple layers, each of components may be mounted in one layer. Therefore, the cumulative tolerance of the electronic device including the antenna structure according to various embodiments of the disclosure can be reduced. In addition, the stack structure, in which multiple layers are cumulated, may be reduced to achieve additional cost savings. The form in which the radiation body is combined to the main board including the RFIC, that is, the form, in which each component is mounted or implemented in the hybrid main board, may enable a mass production structure to be secured.

In the disclosure, although embodiments of an antenna structure including the RFIC and the radiation body (e.g., the antenna element and the cavity-back structure), an antenna module, and an electronic device including same have been described, a manufacturing process for manufacturing same may also be understood as an embodiment of the disclosure.

The manufacturing process of the antenna module according to various embodiments may include a step of integrating the antenna elements on one surface of the board, and a step of integrating the RFIC on the one surface of the board. Here, the RFIC may be integrated at a position independent of each antenna element on the one surface of the board. Additionally, instead of integrating the RFIC, a step in which the RF package is integrated and a step of integrating the RFIC on the RF package may be further included therein. In this way, the antenna module having the coplanar arrangement may be mounted on one surface of one main board together with the RFIC and the antenna elements, so that the integration process thereof is more simplified. In addition, embodiments of the disclosure do not perform a stacking process and a via process for multiple plates as the antenna module having an existing stacked structure, so that the manufacturing process of the antenna module is more simplified.

The manufacturing process of the antenna module according to various embodiments may include: a step of performing a via process in which one or more metal layers inside of the board are penetrated; and a step of integrating the RFIC on one surface of the board. Here, the RFIC may be integrated at a position independent of an area in which the via process is performed on the one surface of the board. Additionally, instead of integrating the RFIC, a step in which the RF package is integrated and a step of integrating the RFIC on the RF package, may be further included therein. In this way, the antenna module having the cavity-back structure may not include a stacking process as the antenna module having an existing stacked structure, so that the manufacturing process of the antenna module is more simplified.

An antenna module according to an embodiment of the disclosure as described above may include a printed circuit board (PCB), a radio frequency integrated circuit (RFIC), and multiple antenna elements configured to radiate a radio frequency (RF) signal, wherein the multiple antenna elements may be arranged in a first area of a first surface of the PCB, and the RFIC may be disposed in a second area of the first surface of the PCB different from the first area.

In one embodiment, multiple feeding lines may be further included therein, wherein the multiple feeding lines may be arranged on the PCB in order for electrical connection between each of the multiple antenna elements and the RFIC.

In an embodiment, the multiple feeding lines may include a first feeding line and a second feeding line, and the multiple antenna elements may include a first antenna element and a second antenna element.

In an embodiment, the first feeding line may be directly connected to the first antenna element and may be configured to deliver a signal provided from the RFIC to the first antenna element.

In an embodiment, the RFIC may be integrated on the first surface of the PCB, based on a ball grid array (BGA) or a land grid array (LGA) scheme, through a first surface of the RFIC.

In an embodiment, a thermal interface material (TIM) may be further included therein, wherein the TIM may be integrated on a second surface which is opposite to the first surface of the RFIC, based on the BGA or the LGA scheme.

In one embodiment, an RF package for an RF signal process may be further included therein, wherein the RF package may be mounted on the RFIC and the second area of the PCB, the RF package may be integrated with the PCB on a first surface of the RF package and may be integrated with the RFIC on a second surface of the RF package, which is a surface opposite to the first surface of the RF package, and the RFIC may be disposed in the second area through the RF package.

In an embodiment, the RFIC may be disposed to be spaced apart from the multiple antenna elements without another board on the first surface of the PCB.

In one embodiment, the antenna module may further include a cover structure, wherein the cover structure may be configured to cover the RFIC and remaining areas of the first surface of the PCB other than the first area.

An antenna module according to an embodiment of the disclosure as described above may include a printed circuit board (PCB) and a radio frequency integrated circuit (RFIC), wherein the PCB may include multiple cavities formed based on vias, the vias may be arranged to penetrate one or more metal layers inside the PCB, in a first area of a first surface of the PCB, and the RFIC may be disposed in a second area of the first surface of the PCB different from the first area.

In one embodiment, multiple feeding lines may be further included therein, wherein the multiple feeding lines may be arranged on the PCB so as to provide an RF signal in the multiple cavities.

In an embodiment, the RFIC may be integrated on the first surface of the PCB, based on a ball grid array (BGA) or a land grid array (LGA) scheme, through a first surface of the RFIC.

In an embodiment, a thermal interface material (TIM) may be further included therein, wherein the TIM may be integrated on a second surface which is opposite to the first surface of the RFIC, based on the BGA or the LGA scheme.

In one embodiment, an RF package for an RF signal process may be further included therein, wherein the RF package may be mounted on the RFIC and the second area of the PCB, the RF package may be integrated with the PCB on a first surface of the RF package and may be integrated with the RFIC on a second surface of the RF package, which is a surface opposite to the first surface of the RF package, and the RFIC may be disposed in the second area through the RF package.

In one embodiment, the antenna module may further include a cover structure, wherein the cover structure may be configured to cover the RFIC and remaining areas of the first surface of the PCB other than the first area.

An electronic device according to an embodiment of the disclosure as described above may include at least one processor, a printed circuit board (PCB), one or more radio frequency integrated circuits (RFIC), and multiple antenna elements arranged in one side of the PCB, wherein the one or more RFICs may include a first RFIC, the multiple antenna elements may include antenna elements of a first group, and the first RFIC, in the one side of the PCB, may be disposed in a first closed curve area associated with the antenna elements of the first group.

In an embodiment, the first closed curve area may connect the antenna elements of the first group and may be an area formed by a closed curve which does not include each antenna element.

In an embodiment, the one or more RFICs may further include a second RFIC, the multiple antenna elements may further include antenna elements of a second group, the second RFIC, on the one surface of the PCB, may be disposed in a second closed curve area associated with the antenna elements of the second group, and the second closed curve area may connect the antenna elements of the second and may be an area formed by a closed curve which does not include each antenna element.

In an embodiment, the first closed curve area, on the same surface of the PCB, may be an area spaced apart from each of the antenna elements of the first group by a predetermined distance or more.

Methods according to the embodiments described in the claims or the specification of the disclosure may be implemented in the form of hardware, software, or a combination of hardware and software.

When implemented in software, a computer-readable storage medium configured to store one or more programs (software modules) may be provided. One or more programs stored in a computer-readable storage medium may be configured for execution by one or more processors in an electronic device. The one or more programs may include instructions which cause an electronic device to execute methods according to embodiments described in the claims or the specification of the disclosure.

The program (a software module or software) may be stored in a random access memory, a non-volatile memory including a flash memory, a read only memory (ROM), an electrically erasable programmable ROM (EEPROM), a magnetic disc storage device, a compact disc-ROM (CD-ROM), digital versatile discs (DVDs), other types of optical storage devices, or a magnetic cassette. Alternatively, it may be stored in a memory configured of a combination of some or all thereof. In addition, in connection with each configuration memory, multiple configuration memories may be included therein.

In addition, the program may be stored in an attachable storage device which can be accessed through a communication network such as the Internet, the Intranet, the local area network (LAN), the wide area network (WAN), or the storage area network (SAN), or a communication network configured of a combination thereof. The storage device may be connected to a device configured to perform the embodiment of the disclosure through an external port. In addition, a separate storage device on the communication network may be connected to the device configured to perform the embodiment of the disclosure.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. An antenna module in a wireless communication system, the antenna module comprising:
    a printed circuit board (PCB);
    a plurality of antenna elements configured to radiate a radio frequency (RF) signal;
    a first radio frequency integrated circuit (RFIC) disposed between a first antenna element and a second antenna element of the plurality of antenna elements; and
    a second RFIC disposed between a third antenna element and a fourth antenna element of the plurality of antenna elements,
    wherein a width of the first RFIC is smaller than a gap between the first antenna element and the second antenna element and a width of the second RFIC is smaller than a gap between the third antenna element and the fourth antenna element, and
    wherein the plurality of antenna elements, the first RFIC and the second RFIC are disposed on a first surface of the PCB.

2. The antenna module of claim 1, further comprising a plurality of feeding lines,
    wherein the plurality of feeding lines are arranged on the PCB in order for an electrical connection between each of the first antenna element and the second antenna element and the first RFIC.

3. The antenna module of claim 2, wherein
    the plurality of feeding lines comprise a first feeding line and a second feeding line.

4. The antenna module of claim 3, wherein the first feeding line is directly connected to the first antenna element and is configured to deliver a signal provided from the first RFIC to the first antenna element.

5. The antenna module of claim 3, wherein the second feeding line is connected to the second antenna element through alternating current (AC) coupling and is configured to deliver a signal provided from the first RFIC to the second antenna element.

6. The antenna module of claim 1, wherein the first RFIC is integrated on the first surface of the PCB, based on a ball grid array (BGA) or a land grid array (LGA) scheme, through a first surface of the first RFIC.

7. The antenna module of claim 6, further comprising a thermal interface material (TIM),
    wherein the TIM is integrated on a second surface opposite to the first surface of the first RFIC, based on the BGA or the LGA scheme.

8. The antenna module of claim 1, further comprising an RF package for an RF signal process,
    wherein the RF package is integrated with the PCB on a first surface of the RF package and integrated with the first RFIC on a second surface of the RF package, which is opposite to the first surface of the RF package, and
    wherein the first RFIC is disposed on the PCB in the second area through the RF package.

9. The antenna module of claim 1, wherein
    the antenna module further comprises a cover structure, and
    wherein the cover structure is configured to cover the first RFIC and the second RFIC, and remaining areas of the first surface of the PCB other than a first area on which the plurality of antenna elements are disposed.

10. The antenna module of claim 1, wherein the first RFIC is disposed on the first surface of the PCB apart from the plurality of antenna elements without another board.

11. An antenna module in a wireless communication system, the antenna module comprising:
- a printed circuit board (PCB);
- a plurality of cavities formed based on vias of the PCB;
- a first radio frequency integrated circuit (RFIC) disposed between a first cavity and a second cavity of the plurality of cavities; and
- a second RFIC disposed between a third cavity and a fourth cavity of the plurality of cavities,
   - wherein the vias, in a first area of a first surface of the PCB, are arranged to penetrate one or more metal layers inside the PCB,
- wherein a width of the first RFIC is smaller than a gap between the first cavity and the second cavity and a width of the second RFIC is smaller than a gap between the third cavity and the fourth cavity, and
- wherein the first RFIC and the second RFIC are disposed on the first surface of the PCB.

12. The antenna module of claim 11, further comprising a plurality of feeding lines,
- wherein the plurality of feeding lines are arranged on the PCB to provide a radio frequency (RF) signal in the plurality of cavities.

13. The antenna module of claim 12, wherein the plurality of feeding lines comprise a first feeding line and a second feeding line.

14. The antenna module of claim 13, wherein the first feeding line is directly connected to the first cavity and is configured to deliver a signal provided from the first RFIC to the first cavity.

15. The antenna module of claim 13, wherein the second feeding line is connected to the second cavity through alternating current (AC) coupling and is configured to deliver a signal provided from the first RFIC to the second cavity.

16. The antenna module of claim 11, wherein the first RFIC is integrated on the first surface of the PCB, based on a ball grid array (BGA) or land grid array (LGA) scheme, through a first surface of the first RFIC.

17. The antenna module of claim 16, further comprising a thermal interface material (TIM),
- wherein the TIM is integrated on a second surface opposite to the first surface of the first RFIC, based on the BGA or the LGA scheme.

18. The antenna module of claim 11, further comprising an RF package for an RF signal process,
- wherein the RF package is integrated with the PCB on a first surface of the RF package and integrated with the first RFIC on a second surface of the RF package, which is opposite to the first surface of the RF package, and
- wherein the first RFIC is disposed on the PCB through the RF package.

19. The antenna module of claim 11, further comprising a cover structure,
- wherein the cover structure is configured to cover the first RFIC and the second RFIC, and remaining areas of the first surface of the PCB other than the first area.

20. The antenna module of claim 11, wherein the first RFIC is disposed on the first surface of the PCB apart from the plurality of cavities without another board.

* * * * *